United States Patent
Pappert et al.

(10) Patent No.: US 7,236,122 B2
(45) Date of Patent: Jun. 26, 2007

(54) SELF-PROTECTING DEVICE FOR AN OBJECT

(75) Inventors: Gunnar Pappert, Altdorf (DE); Andreas Günther, Lauf (DE); Volker Koch, Rückerdorf (DE)

(73) Assignee: Diehl Munitionssysteme GmbH & Co. KG, Röthenbach (DE)

( * ) Notice: Subject to any disclaimer, the term of this patent is extended or adjusted under 35 U.S.C. 154(b) by 0 days.

(21) Appl. No.: 10/519,416

(22) PCT Filed: Jun. 18, 2003

(86) PCT No.: PCT/EP03/06418

§ 371 (c)(1),
(2), (4) Date: Dec. 12, 2005

(87) PCT Pub. No.: WO2004/003455

PCT Pub. Date: Jan. 8, 2004

(65) Prior Publication Data

US 2006/0103569 A1 May 18, 2006

(30) Foreign Application Priority Data

Jun. 28, 2002 (DE) ................. 102 29 273

(51) Int. Cl.
*G01S 13/00* (2006.01)
*G01S 13/72* (2006.01)
(52) U.S. Cl. ............... 342/67; 342/53; 342/97
(58) Field of Classification Search ............ 342/53, 342/67, 97
See application file for complete search history.

(56) References Cited

U.S. PATENT DOCUMENTS

| 5,483,865 | A | * | 1/1996 | Brunand | 342/67 |
| 2003/0117309 | A1 | * | 6/2003 | Pappert et al. | 342/67 |
| 2006/0028373 | A1 | * | 2/2006 | Fullerton et al. | 342/67 |
| 2006/0028374 | A1 | * | 2/2006 | Fullerton | 342/67 |
| 2006/0071847 | A1 | * | 4/2006 | Fiore et al. | 342/67 |

FOREIGN PATENT DOCUMENTS

| DE | 44 26 014 A1 | 7/1994 |
| DE | 100 24 320 | 5/2000 |
| EP | 1 096 219 A1 | 10/2000 |

* cited by examiner

*Primary Examiner*—Dan Pihulic
(74) *Attorney, Agent, or Firm*—Scully, Scott, Murphy & Presser, P.C.

(57) ABSTRACT

An object self-protection apparatus (12) having a monitoring device (14) which is fixed with respect to the object and a launch container (18), in particular for fragmentation projectiles, which has a target-tracking radar device (20) for the approach movement of a missile (22) which is to be defended against. The monitoring device (14) which is fixed with respect to the object and the target-tracking radar device (20) are connected together with an aiming drive for the launch container (18). Hereby, an expensive search radar is replaced by a passive sensor device (16) forming the monitoring device (14) which is fixed with respect to the object. The passive sensor device (16) generates accurately measured angular information in respect of the approaching missile (22). The distance and the speed of the missile (22) are then determined by the target-tracking radar device (20).

6 Claims, 1 Drawing Sheet

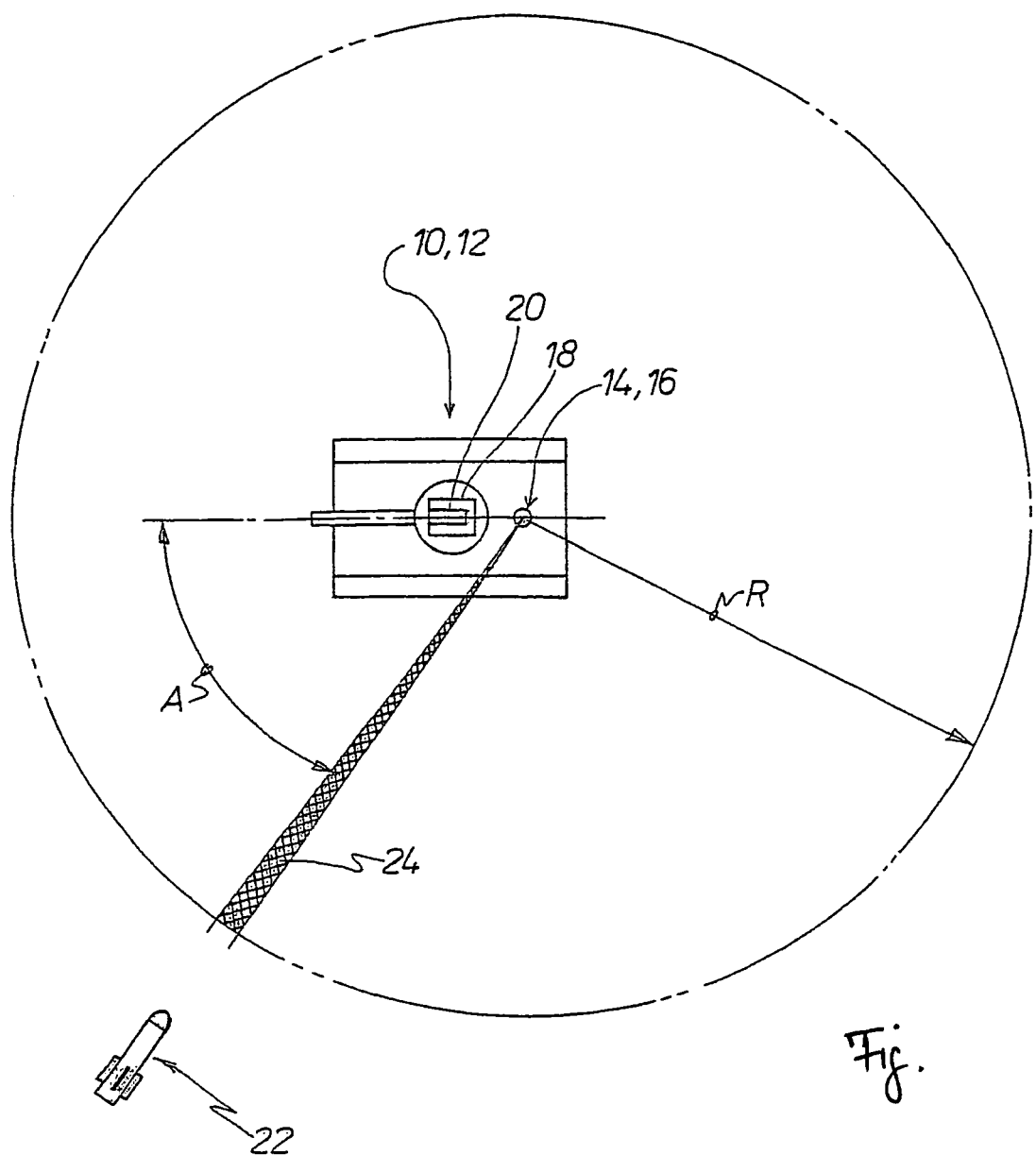

SELF-PROTECTING DEVICE FOR AN OBJECT

BACKGROUND OF THE INVENTION

1. Field of the Invention

The invention concerns an object self-protection apparatus, consisting of a monitoring device which is fixed with respect to the object for vectoring a target-tracking radar device, for the close-range determination of the distance and speed of a missile which is to be defended against, located on a launch container which can be aimed at the threat represented by the missile.

2. Discussion of the Prior Art

An object self-protection apparatus of that kind is known from DE 100 24 320 A1. Described therein is a radar device with a planar antenna comprising grouped individual radiating devices for object self-protection against the threat from an attacking missile, wherein the individual radiating devices are arranged in at least one vertically oriented group as monitoring radar on the substructure, which is fixed with respect to the object, of the aiming drive for a launch container for fragmentation projectiles, which in turn is provided with a target-tracking radar vectored by the monitoring radar for the approach movement of the missile to be defended against. That known radar device, that is to say its search radar for vectoring of the target-tracking radar, involves a considerable level of development complication and expenditure. In addition the search radar is relatively costly in respect of its procurement.

SUMMARY OF THE INVENTION

Therefore the object of the present invention is to provide an object self-protection apparatus of the kind set forth in the opening part of this specification in which a relatively cost-intensive search radar as a monitoring device which is fixed with respect to the object is eliminated, without adversely affecting the self-protection properties.

According to the invention that object is attained in that the monitoring device is formed by a passive sensor device which is in the form of panoramic sensor system for angular detection of the approaching missile. Preferred embodiments and developments of the object self-protection apparatus according to the invention are characterized in the appendant claims.

In the object self-protection apparatus according to the invention the monitoring device which is fixed with respect to the object is not formed by a relatively cost-intensive monitoring radar with individual radiating devices arranged in at least one vertically oriented group, but by a passive sensor device which is provided for angle detection of the missile which is approaching and which is to be defended against. The passive sensor device which can be formed by an image-producing and -processing UV sensor device or by an image-producing and -processing IR sensor device also serves for sensor fusion with a simple radar missile warner for clear close range detection, whereby for example false alarms are avoided. Consequently in the event of a threat by an approaching missile the launch container does not need to be immediately pivoted. A further advantage lies in the relatively certain and secure defence even in respect of threats which are fired off in the close range of the object to be protected which in particular is a vehicle to be protected.

The passive sensor device is preferably in the form of a panoramic sensor system with a high level of angular measuring accuracy. The panoramic sensor system permits accurate angular detection of the respective missile to be defended against, for example by detecting the launch flash or the propulsion unit radiation of the missile to be defended against. The panoramic sensor system is in a way combined with a target-tracking radar device which is provided for determining the distance and the speed of the missile to be defended against, in the close region. The target-tracking radar device can have a rigid antenna characteristic.

The use of a close-range target-tracking radar provides that the relative disadvantage of the passive sensor device in respect of the reaction time in the event of a threat which is fired at close range is advantageously at least partially eliminated by virtue of the fact that the close-range target-tracking radar very rapidly makes available the distance and speed component of the threat, that is to say the missile which is to be defended against. The close range is for example desirably of the order of magnitude of 200 to 300 m for the AT-munition signature of a missile to be defended against. In combination with the angular information from the passive sensor device, which is processed for example after about 25 to 100 msec, the target-tracking radar device provided on the launch container can be pivoted to the approaching threat. The target-tracking radar device takes over the threat at the target transfer point.

The target-tracking radar device is preferably formed by a monopole radar device. At the target transfer point of the threat, the angular information of the target-tracking radar device can be suitably supported by the high level of angular measuring accuracy of the passive sensor device in impact point prediction (fire management).

In terms of the system time expenditure for successfully combating for example anti-tank ammunition which is launched in the close region of the object to be protected, that is to say the vehicle to be protected, in accordance with the invention there is a slight increase in the amount of time required, but the deficiencies of a purely passive system which does not afford any distance and speed information are eliminated.

The object self-protection apparatus according to the invention has the following advantages:

Optimisation of the integrateability of the self-protection apparatus, that is to say of the distance-effective protection system on any armoured vehicles by virtue of integration of the complete sensor system on the launch container or along the vehicle turret;

Use of radar systems in combination with an angle-resolving passive sensor device and thus making use of the advantages of the radar in regard to all-weather capability, insensitivity to false alarms and soft kill measures, with the radar system being of a simple structure;

Use of a Doppler- and distance-delivering, relatively small close-range radar in the proximity of the passive sensor device on the vehicle turret for angular detection and for vectoring of the target-tracking radar device on the launch container for target tracking in parallel relationship with the projectile axis, in all three spatial co-ordinates, that is to say for determining distance, speed and angular lay-off in azimuth and elevation, for fire management and impact point prediction;

Optimising the vectoring speed and accuracy by the sensor function, that is to say angular measurement by the passive sensor device and distance and speed measurement by the close-range radar, that is to say the target-tracking radar device;

Use of standard components such as Cassegrain antennae/frequency scanned planar radar for risk minimisation and development time curtailment for example in an AWISS launcher; and Simplicity of the fire management problems as the target-tracking radar device is arranged in parallel relationship with the weapon so that co-ordinate system transformation procedures are reduced to a minimum.

BRIEF DESCRIPTION OF THE DRAWINGS

An embodiment of the object self-protection apparatus according to the invention is described hereinafter in connection with an embodiment, diagrammatically illustrated in the drawing, of an object in the form of an armoured vehicle and a missile to be defended against.

DETAILED DESCRIPTION OF THE INVENTION

The Figure is a view from above of an armoured vehicle 10 with an object self-protection apparatus 12 having a monitoring device 14 which is fixed with respect to the object and which is formed by a passive sensor device 16, and a launch container 18, in particular for fragmentation projectiles, which has a target-tracking radar device 20 for detecting the approach movement of a missile 22 to be defended against.

The passive sensor device 16 can be formed by an image-producing and image-processing IR sensor device or an image-producing and image-processing UV sensor device. The passive sensor device 16 is in the form of a panoramic sensor system with a high level of angular measuring accuracy. That is diagrammatically indicated by the radius R and the narrow radial area region 24 in crossed hatching. The angle A at which the missile 22 to be defended against is approaching the vehicle 10 is determined with a high degree of measuring accuracy by means of the passive sensor device 16.

The target-tracking radar device 20 does not generate any angular information but it serves solely and simply to determine the distance and the speed of the missile 22 to be defended against, in particular in the close-range area. The passive sensor device 16 and the target-tracking radar device 20 are connected together with an aiming drive for the launch container 18 of the vehicle 10 to be protected.

The invention claimed is:

1. An object self-protection apparatus comprising a monitoring device (14) which is fixed with respect to the object for vectoring a target-tracking radar device (20), for the close-range determination of distance and speed of a missile (22) which is to be defended against, located on a launch container (18) which can be aimed at said threat, represented by said missile, wherein the monitoring device (14) is formed by a passive sensor device (16), and the passive sensor device (16) is formed by an image-producing and image-processing UV sensor device.

2. An object self-protection apparatus according to claim 1 characterized in that the passive sensor device (16) is formed by an image-producing and image-processing IR sensor device.

3. An object self-protection apparatus according to claim 1 characterized in that the passive sensor device (16) is in the form of a panoramic sensor system with a high angular measuring accuracy.

4. An object self-protection apparatus according to claim 1 characterized in that the target-tracking radar device (20) is provided for determining the distance and the speed of the missile (22) which is to be defended against at a close range.

5. An object self-protection apparatus according to claim 4 characterized in that the close-range for AT (anti-tank) ammunition signature of a missile (22) which is to be defended against is in the order of magnitude of from 200 to 300 m.

6. An object self-protection apparatus according to claim 4 characterized in that the target-tracking radar device (20) is a monopulse radar device.

* * * * *